(12) United States Patent
Michel

(10) Patent No.: US 9,296,020 B2
(45) Date of Patent: Mar. 29, 2016

(54) WHISK WIPER

(71) Applicant: Matthew Justin Michel, Los Angeles, CA (US)

(72) Inventor: Matthew Justin Michel, Los Angeles, CA (US)

(*) Notice: Subject to any disclaimer, the term of this patent is extended or adjusted under 35 U.S.C. 154(b) by 547 days.

(21) Appl. No.: 13/674,161

(22) Filed: Nov. 12, 2012

(65) Prior Publication Data

US 2013/0068250 A1 Mar. 21, 2013

Related U.S. Application Data

(63) Continuation-in-part of application No. 12/098,437, filed on Apr. 6, 2008, now Pat. No. 8,307,491.

(51) Int. Cl.
| | |
|---|---|
| A47L 25/00 | (2006.01) |
| B01F 15/00 | (2006.01) |
| B08B 1/00 | (2006.01) |
| A47J 43/10 | (2006.01) |
| B01F 13/00 | (2006.01) |
| A47J 43/28 | (2006.01) |

(52) U.S. Cl.
CPC .............. *B08B 1/006* (2013.01); *A47J 43/1087* (2013.01); *A47J 43/1093* (2013.01); *A47J 43/28* (2013.01); *A47J 43/288* (2013.01); *B01F 13/002* (2013.01); *B01F 15/00045* (2013.01); *B01F 15/00512* (2013.01); *B08B 1/005* (2013.01)

(58) Field of Classification Search
CPC ............ B01F 7/0005; B01F 15/00019; B01F 15/00058; A47J 43/1093
USPC ......................................................... 366/129
See application file for complete search history.

(56) References Cited

U.S. PATENT DOCUMENTS

| | | | | |
|---|---|---|---|---|
| 921,086 | A | * | 5/1909 | Clark ........................... 15/218.1 |
| 946,370 | A | * | 1/1910 | Kelmel ........................... 15/160 |
| 1,164,156 | A | * | 12/1915 | Yeager ........................ 15/210.1 |
| 1,367,280 | A | * | 2/1921 | Reiges ......................... 15/218.1 |
| 1,407,674 | A | * | 2/1922 | Roepke .......................... 15/160 |
| 1,934,556 | A | * | 11/1933 | Pelz ................................ 15/245 |
| 1,996,299 | A | * | 4/1935 | Layland ...................... 15/210.1 |
| 2,046,334 | A | * | 7/1936 | Loeber ........................... 30/169 |
| 2,198,698 | A | * | 4/1940 | Fitzmeyer ................... 15/210.1 |
| 2,280,225 | A | * | 4/1942 | Finely ............................ 15/245 |
| 2,510,114 | A | * | 6/1950 | Hummel ..................... 15/220.4 |
| 2,580,727 | A | * | 1/1952 | Bryan ......................... 15/220.4 |
| 2,644,183 | A | * | 7/1953 | Kellett ....................... 15/257.05 |
| 2,699,565 | A | * | 1/1955 | Brough .......................... 15/245 |
| 2,773,277 | A | * | 12/1956 | Souter ......................... 15/220.4 |
| 2,916,758 | A | * | 12/1959 | Hamilton .................... 15/220.4 |
| 2,941,224 | A | * | 6/1960 | Hercer ........................... 15/118 |
| 3,224,029 | A | * | 12/1965 | Domingos ................. 15/104.92 |
| 3,317,944 | A | * | 5/1967 | Napier et al. ................ 15/244.1 |
| 3,408,677 | A | * | 11/1968 | Yates ......................... 15/236.02 |

(Continued)

*Primary Examiner* — Tony G Soohoo

(57) ABSTRACT

A whisk wiper, a device having a a plurality of intersecting slits angularly disposed in an asterisk type pattern, is mounted onto a whisk. It is pulled down over the loops 44, each loop 44 guided through a slit 32. To clean off mixture 50 stuck to the whisk 46 the whisk wiper 30 is simply pulled off, the opposed edges of each slit 32 wiping the loops 44 clean, the removed mixture 50 collected on the top side of the whisk wiper 30 so it can be then returned to the mixing bowl 52. The whisk wiper 30 is also a splash guard, support to hang the whisk 46 on the edge of a bowl, keeps the whisks loops up off the surface when the whisk is set down and the outer edge 40 can be used to wipe out the mixing bowl 52. Additionally the whisk wiper can be configured to be turned inside out to allow the slits to be easily cleaned.

20 Claims, 6 Drawing Sheets

(56) References Cited

U.S. PATENT DOCUMENTS

| | | | | |
|---|---|---|---|---|
| 3,694,845 A * | 10/1972 | Engelsher | | 15/244.4 |
| 4,017,935 A * | 4/1977 | Hernandez | | 15/220.4 |
| 4,084,287 A * | 4/1978 | Ingram et al. | | 15/210.1 |
| 4,164,054 A * | 8/1979 | Hanson et al. | | 15/220.4 |
| 4,245,367 A * | 1/1981 | Stoute | | 15/220.4 |
| 4,324,193 A * | 4/1982 | Cutler | | 114/199 |
| 4,953,999 A * | 9/1990 | Rivers | | 401/9 |
| 4,996,800 A * | 3/1991 | Mangus | | 451/28 |
| 5,018,237 A * | 5/1991 | Valley | | 15/244.1 |
| 5,191,670 A * | 3/1993 | Lake et al. | | 15/160 |
| 5,272,782 A * | 12/1993 | Hutt | | 15/105 |
| 5,308,406 A * | 5/1994 | Wallock et al. | | 134/42 |
| D353,238 S * | 12/1994 | Francis | | D32/42 |
| 5,732,435 A * | 3/1998 | Williams et al. | | 15/104.92 |
| D396,907 S * | 8/1998 | Donnelly | | D32/43 |
| 6,086,275 A * | 7/2000 | King | | 401/11 |
| 6,280,531 B1 * | 8/2001 | Galbreath | | 134/6 |
| 6,851,215 B2 * | 2/2005 | Conrad | | 43/17.2 |
| 7,553,379 B2 * | 6/2009 | Vickroy | | 134/6 |
| D622,468 S * | 8/2010 | Parker | | D32/42 |
| 8,307,491 B1 * | 11/2012 | Michel | | 15/210.1 |
| 2004/0141407 A1 * | 7/2004 | Settele | | 366/129 |
| 2013/0068250 A1 * | 3/2013 | Michel | | 134/6 |

\* cited by examiner

WHISK WIPER

CROSS REFERENCE TO RELATED APPLICATION

This application is a continuation in part of U.S. patent application Ser. No. 12/098,437, filed Apr. 6, 2008, the entire disclosure of which is incorporated by reference for any and all purposes.

FIELD OF THE INVENTION

The present invention relates to a utensil cleaning device which removes food stuck to a cook's whisk with a plurality of slits which act as squeegees to wipe the whisk's loops clean.

BACKGROUND OF THE INVENTION

The use of a whisk in mixing ingredients often involves mixtures which stick to the loops of the whisk, which makes returning this portion of the mixture to the mixing bowl, and subsequently cleaning the whisk, difficult. After shaking the whisk over the bowl, a cook's only other option has been to try to wipe the wire loops between their fingers. In the end the whisk has been rinsed in the sink, a slow process resulting in the loss of ingredients down the drain. Since whisks have a cage like structure it is not possible to clean them effectively with cleaning implements which are applied from the outside of the whisk as the inner surfaces remain inaccessible.

Electric mixers and egg beaters have addressed this same problem with centrifugal cleaning. The mixer is run at high speed to shake off any stuck mixture. So called "self-cleaning beaters" are simply beaters that have no center posts so that the centrifugal cleaning can be more effective. This is essentially only a high speed version of shaking the whisk over the bowl.

While there have not been innovative solutions to cleaning the cooks whisks there have been a few innovations in the device itself. The 2005 Hughes U.S. patent application 20070084063 teaches a whisk that includes a protrusion from the handle which has the advantage of keeping the loops of the whisk up off the surface when the whisk is set down. This allows for a more sanitary kitchen as the loops of the whisk do not come into contact with counter tops. Similarly, the 2008 Lion U.S. patent application 20080043568 features a whisk having an additional clip to allow the whisk to be supported on the edge of the mixing bowl. The 2006 Settele U.S. Pat. No. 7,044,631 teaches a collar which can be placed on a conventional whisk which has the benefit, once it is drawn up away from the handle, of collapsing the loops of the whisk and thereby making the whisk more compact for storage. This collar has the added benefit of being applicable to a conventional whisk and does not require one to be manufactured specifically with the device.

While the problem of cleaning the complex structure of the whisk has not been addressed by the prior art, methods of cleaning other complex structures have been taught. Solutions to the problem of cleaning the many bristles of a comb has been taught in several patents including the 1946 Heyman U.S. Pat. No. 2,437,298 which teaches a simple fabric strip having a row of perforations coinciding with the bristles of a conventional flat comb. The fabric strip is pulled down to the base of the comb where it remains until it is time to clean the comb at which point it is pulled off taking the caught hair and debris with it. Similarly the 1977 Peilet U.S. Pat. No. 4,001,910 teaches a comb having a perforated plate which lifts up from the back of the comb, each perforation having a single bristle passing through it and including flexible wiping flaps to wipe the bristle clean as the plate is lifted.

An advantage of using flexible wiping flaps or blades, as in a squeegee, in cleaning an object is their ability to flexibly conform to the surface being cleaned. The 1933 Pelz U.S. Pat. No. 1,934,556 teaches a C shaped squeegee able to clean a trapezoidal box successfully on all sides, the squeegee blade edges flexibly conforming to the surfaces. The 1971 Fink U.S. Pat. No. 3,583,018 teaches a squeegee consisting of a slit in a rubbery sheet which will remove most debris from golf club head, the opposed edges of the slits acting as squeegees.

Scrapers, wipers and squeegees which are in opposed pairs have not been previously used in cleaning a whisk type structure but have been employed as an effective cleaning structure in many devices. The 1960 Hercer U.S. Pat. No. 2,941,224 is one of many spatula cleaners employing opposed wipers or scrapers. The 1990 Tremblay U.S. Pat. No. 4,891,859 teaches a wiper system consisting of opposed squeegees to clean a motor vehicle dipstick.

While the cleaning of a whisk type structure does not appear to be in any prior art, the references sited demonstrate the efficacy of cleaning a complex structure with opposed squeegees disposed to follow the contours of the item to be cleaned.

OBJECTS AND ADVANTAGES

The objects and advantages of the present invention are to provide the first effective device for cleaning a cooks whisk, which also retains the mixture it removes from the whisk to be returned to the mixing bowl, can be used to wipe out a mixing bowl, supports a whisk on the edge of a mixing bowl, prevents a whisk's loops from touching the surface when the whisk is set down, and which acts as a splash guard while the whisk is in use.

SUMMARY OF THE INVENTION

The present invention is herein called a whisk wiper and is a disk having a number of flexible slits, intersecting at angles in the center of the disk, making an asterisk or star like pattern. The whisk wiper is pulled over a whisks wire loops down to the handle, prior to the whisks use, each loop passing through a slit. When the cook wants to remove all the mixture stuck on the whisk the wiper is pulled off, the sides of each slit acting as pairs of opposed squeegees wiping the whisks loops clean. The whisk wiper, once removed, has the mixture which was wiped off collected onto its top side. The whisk wiper can then be wiped off on the lip of the mixing bowl. In this way nearly all of the mixture is returned to the mixing bowl with the whisk and whisk wiper both left relatively clean.

The use of the whisk wiper has several added benefits as well. Once in place on a whisk it acts as a splash guard to keep a cooks hand clean while mixing. The whisk can hang on the edge of a mixing bowl, supported by the whisk wiper. When the whisk is set down the wire loops are kept up off the surface as the whisk is supported by the edge of the whisk wiper instead. Additionally the whisk wiper's outer edge can be used to wipe out a mixing bowl.

Figure 1:
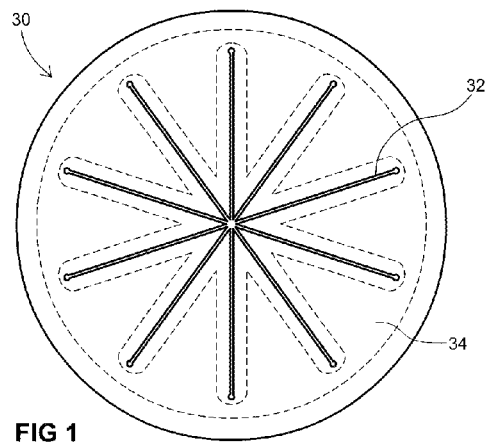
FIG. 1 shows a top view of the whisk wiper 30 with the rigid frame 34 within shown with a dotted line.

| DRAWINGS - REFERENCE NUMERALS | | | |
| --- | --- | --- | --- |
| 30 | whisk wiper | 32 | slit |
| 34 | rigid frame | 36 | flexible material |
| 38 | slot | 40 | beveled edge |
| 42 | groove | 44 | wire loop |
| 46 | whisk | 47 | base |
| 48 | handle | | |
| 50 | mixture | 52 | mixing bowl |
| 54 | lip | 56 | first alternative embodiment of the whisk wiper |
| 58 | extra slit | 60 | second alternative embodiment of the whisk wiper |
| 62 | hard scraper | 64 | third alternative embodiment of the whisk wiper |
| 66 | curved slits | 68 | concave portion |
| 70 | acutely angled point | 72 | fourth alternative embodiment of the whisk wiper |
| 74 | thickened ring | 76 | thickened wedge |
| 78 | concave edge | 80 | concave groove |

-continued

DRAWINGS - REFERENCE NUMERALS

| 82 | sponge | 84 | deep slit |
| 86 | brushes | 88 | fifth alternative embodiment of the whisk wiper |
| 90 | sixth alternative embodiment of the whisk wiper | | |
| 92 | sleeve | 94 | seventh alternative embodiment of the whisk wiper |
| 96 | edge extension | 98 | compressed slit |

DETAILED DESCRIPTION OF THE INVENTION

FIG. 1 shows a top view of an embodiment of the present invention generally designated 30, and herein referred to as a whisk wiper 30. The whisk wiper 30 is a disk having a number of slits 32 intersecting through its center, and which are disposed in angularly spaced orientation to make an asterisk type pattern. The number of slits 32 is ideally chosen to correspond with the number of wire loops on the whisk with which the whisk wiper 30 will be used. A rigid frame 34 within the whisk wiper 30 is shown with a dotted line.

The dimensions of the whisk wiper 30 and the number of the slits 32 can vary and the dimensions given here are just an example. The size of the whisk wiper 30 shown in FIG. 1 is 9 cm in diameter, with 5 slits 32 which are 6.5 cm in length.

Figure 2:
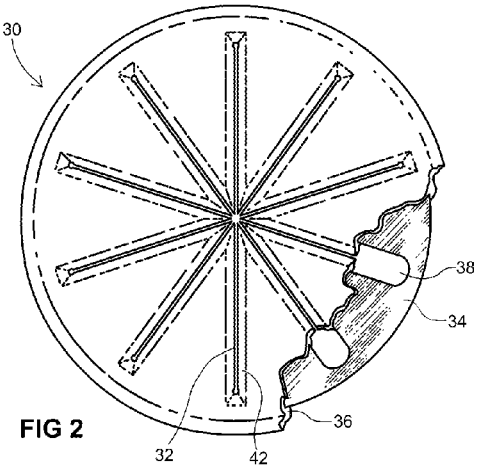
FIG. 2 shows a bottom view of the whisk wiper 30 of FIG. 1 with a break away showing the rigid frame 34 within.
Figure 5:
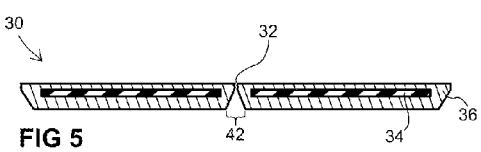
FIG. 5 is a cross-sectional view of the whisk wiper 30 of FIG. 1 showing the rigid frame 34 within, and one of the slits 32 and groove 42.

FIG. 2 shows the underside of the whisk wiper 30 including a break away view revealing the rigid frame 34 within. This example of the whisk wiper 30 could be constructed of a rigid frame 34 made of aluminum, covered with silicone nonabsorbent flexible material 36. The rigid frame 34 shown is 8 cm in diameter with slots 38, which are oblong apertures 7 cm in length and 7 mm in width. As shown in the cross sectional view of FIG. 5 the thickness of the rigid frame 34 is 2 mm and the thickness of the whisk wiper 30 is 7 mm.

Figure 3:
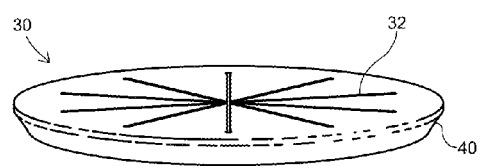
FIG. 3 is a perspective view showing the top and side of the whisk wiper 30 of FIG. 1.
Figure 4:
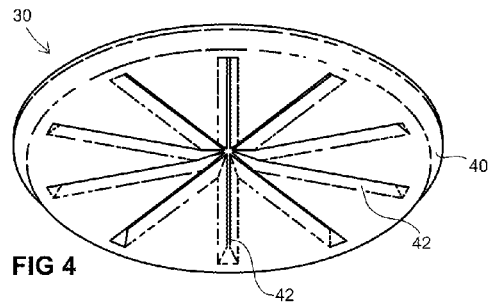
FIG. 4 is a perspective view showing the bottom and side of the whisk wiper 30 of FIG. 1.
Figure 6:
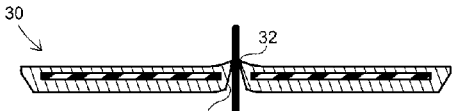
FIG. 6 is the view of FIG. 5 with a single wire loop 44 being passed through the slit 32.

The top side of the whisk wiper 30 shown in FIG. 1 and again in perspective view in FIG. 3 is flat without depressions or protrusions. The underside shown in FIG. 2 and again in perspective view in FIG. 4 has a beveled edge 40 and grooves 42 surrounding each slit 32. The grooves 42 are 5 mm wide and have beveled walls leading into each slit 32. In use, as shown in FIG. 6 a wire loop 44 is guided by the grooves 42 into the slit 32, the silicone flexing aside to allow the wire loop 44 to pass through the slit 32.

The operative edges of the whisk wiper 30, which are the opposed edges of each slit 32 and the beveled edge 40, have a flexibility which is easily controlled by a number of factors in the design. The flexibility is determined by the physical properties of the flexible material 36, it's thickness which in the present embodiment is 7 mm, the size and shape of the grooves 42 and the beveled edge 40, the distance between the outer beveled edge 40 and the outer edge of the rigid frame 34, in this embodiment 5 mm, and the distance of the opposed edges of the slits 32 from the inner edges of the slots 38 in the rigid frame 34, in this embodiment 3.5 mm.

Figure 7:
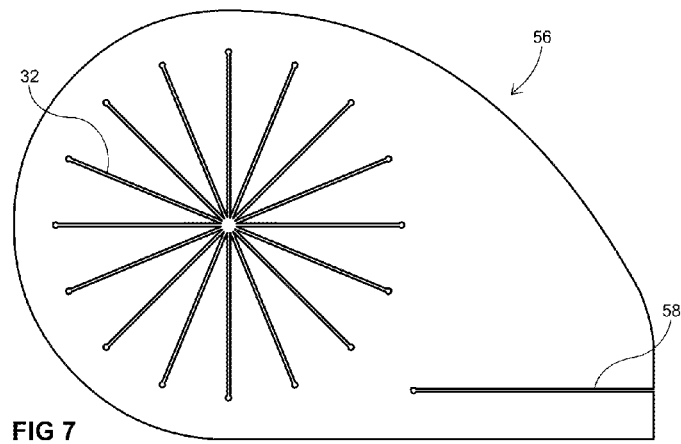
FIG. 7 shows a top view of a first alternative embodiment of the whisk wiper 56.
Figure 8:
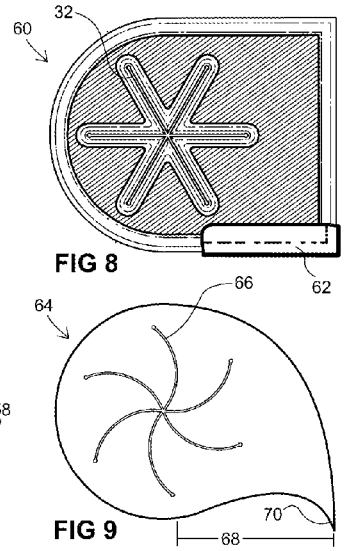
FIG. 8 shows a top view of a second alternative embodiment of the whisk wiper 60 which includes a hard scraper 62.
Figure 9:
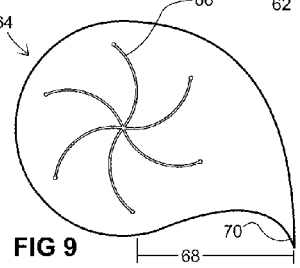
FIG. 9 shows a top view of a third alternative embodiment of the whisk wiper 64 having curved slits 66, a concave portion 68, and an acutely angled point 70.

FIG. 7, FIG. 8 and FIG. 9 show alternative embodiments which will be described later in this description.

Figure 10:
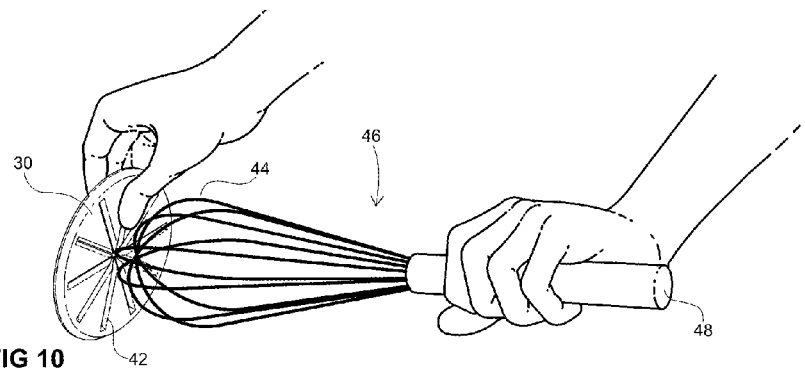
FIG. 10 shows a cook lining up the wire loops 44 with the grooves 42 in the whisk wiper 30 as they are about to be inserted.

FIG. 10 shows the whisk wiper 30 being held in the cook's right hand as it is lined up with a conventional whisk 46, held in the cook's left hand. The whisk 46 shown has five wire loops 44 disposed in angularly spaced orientation about the axis of the handle 48, each loop having two ends secured to the inner end of the handle 48.

The use of the whisk wipe is illustrated beginning with FIG. 10 which shows the cook lining up the curved ends of the wire loops 44, with the grooves 42 of the whisk wipe 30. It is not necessary to be precise in this alignment as the wide grooves 42 present an ample target for the wire loops 44 and both the material of the whisk wipe 30 and the wire loops 44 are flexible. It is also not necessary for the length of the slits 32 to exceed the width of the wire loops 44 as the wire loops 44, being flexible, can compress in passing through.

Figure 11:
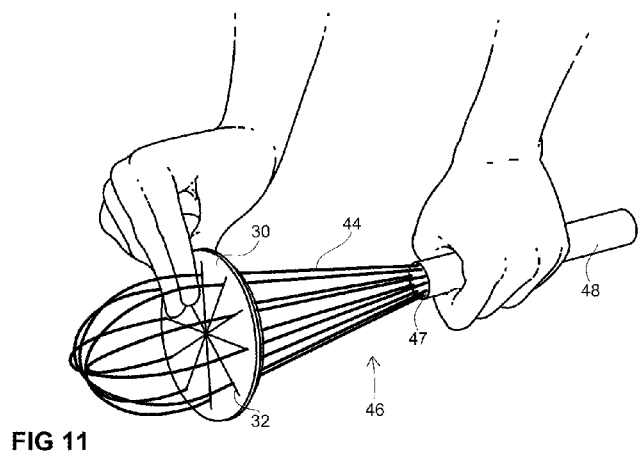
FIG. 11 shows the step subsequent to FIG. 10 with the whisk wiper 30 being pulled down over the wire loops 44 toward the base 47, to which the loops 44 are attached, at the inner end of the handle 48.

Once the wire loops 44 are inserted through the slits 32 of the whisk wipe 30, as shown in FIG. 11, the whisk wipe is pulled toward the base 47 of the loops 44 shown at the inner end of the handle 48. The base 47 is the place at which the loops are attached or come together. The friction force opposing this movement is determined by materials and the flexibility of the opposed edges of the slits 32.

Figure 12:
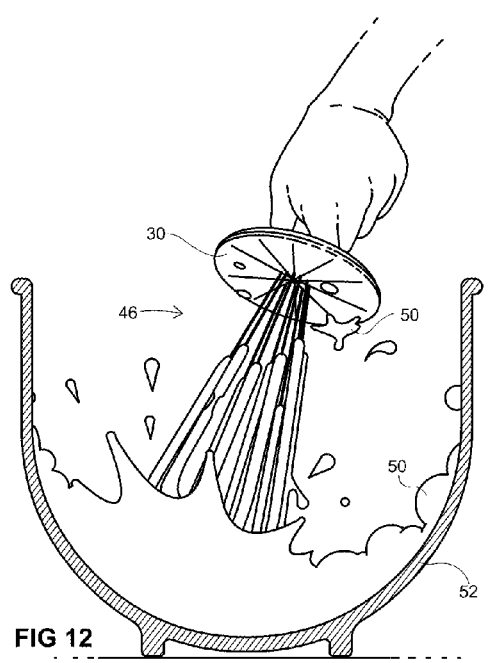
FIG. 12 shows the whisk wiper 30 in position on the whisk 46 and functioning as a splash guard as the whisk 46 is being used mixing and splashing mixture 50 around in a mixing bowl 52, shown in cross section.

FIG. 12 shows the whisk wiper 30 in place as the whisk 46 is being used to mix a mixture 50, in a mixing bowl 52, which is shown in cross section. The whisk wiper 30 has the added benefit of being a splatter guard as shown in FIG. 12, as the mixture 50 splashes back and lands upon the whisk wipe 30, instead of the cooks hand.

Figure 13:
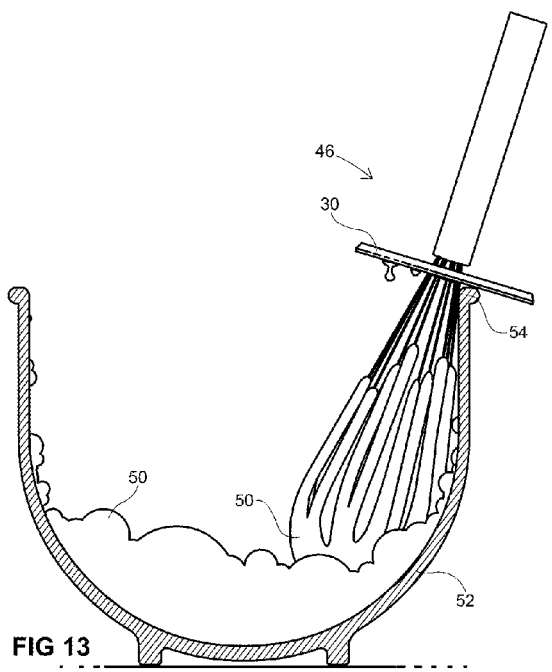
FIG. 13 shows the whisk 46, covered with mixture 50, hanging on the lip 54 of the mixing bowl 52, shown in cross section, supported by the whisk wiper 30.

FIG. 13 shows the whisk 46 hanging by the whisk wiper 30 on the lip 54 of the mixing bowl 52. Otherwise a whisk 46 without a whisk wiper 30 in place would slide into the mixing bowl 52. With the whisk wipe 30 in place the whisk 46 is prevented from sliding down into the bowl. This would be desirable should the cook wish to take a break or use both hands to add additional ingredients to the mixture 50.

Figure 14:
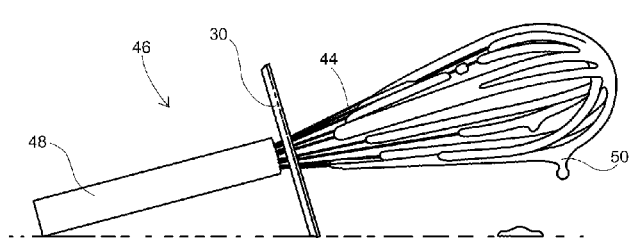
FIG. 14 shows the whisk 46 laying down on the handle 48 and the whisk wiper 30, the wire loops 44 covered with mixture 50.

FIG. 14 shows the whisk 46 lying upon a horizontal surface with the whisk wiper 30 in place and its wire loops 44 covered with mixture 50. Without the whisk wiper 30 in place the whisk would normally rest on the wire loops 44. With the whisk wiper 30 in place the whisk 46 is supported by the outer end of the handle 48 and the whisk wiper 30 with the wire loops 44 suspended above the horizontal surface. This prevents both the mess and unsanitary consequences of having the mixture 50 contact the horizontal surface.

Figure 15:
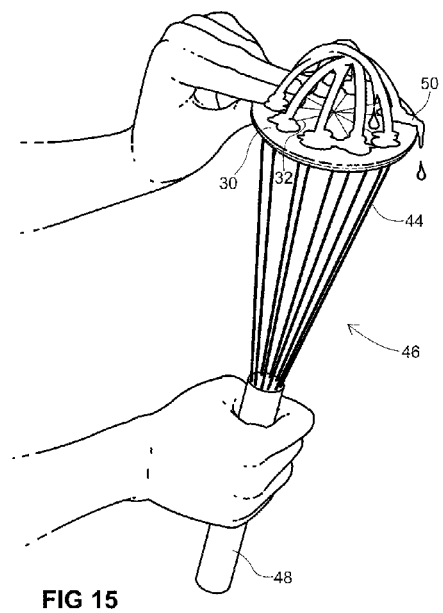
FIG. 15 shows the whisk wiper 30 being pulled up off the whisk 46, the wire loops 44 being wiped clean in the process, and the mixture 50 pooling and gathering on the top surface of the whisk wiper 30.

Once the cook whishes to remove the mixture 50 which is stuck to the wire loops 44 they simply pull the whisk wiper 30 off. FIG. 15 shows the cook pulling the whisk wiper 30 away from the inner end of the handle 48 and toward the outer ends of the wire loops 44. As the whisk wiper 30 is pulled off the opposed edges of the slits 32 function as squeegees and wipe the wire loops 44 clean. The mixture 50 which is wiped off the wire loops 44 is collected on the top side of the whisk wiper 30. This step can be performed quickly without skill or precision.

Figure 16:
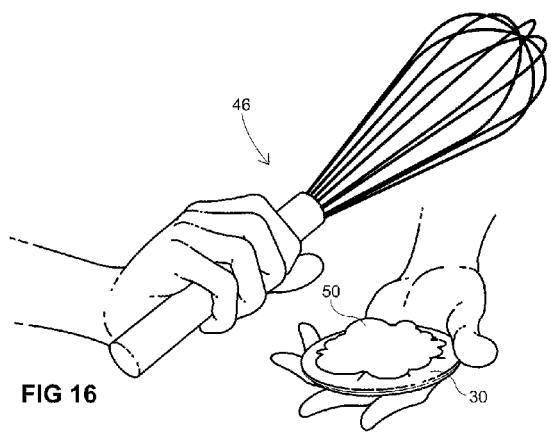
FIG. 16 shows, subsequent to FIG. 15, the cleaned whisk 46 in the right hand and the whisk wiper 30, in the left hand, the mixture 50 collected onto its top surface.

FIG. 16 shows the result subsequent to the removal of the whisk wipe 30 as shown in FIG. 15. FIG. 16 shows the whisk 46, now clean, and the whisk wipe 30 with the mixture 50 gathered onto its top side.

Figures 17, 18:
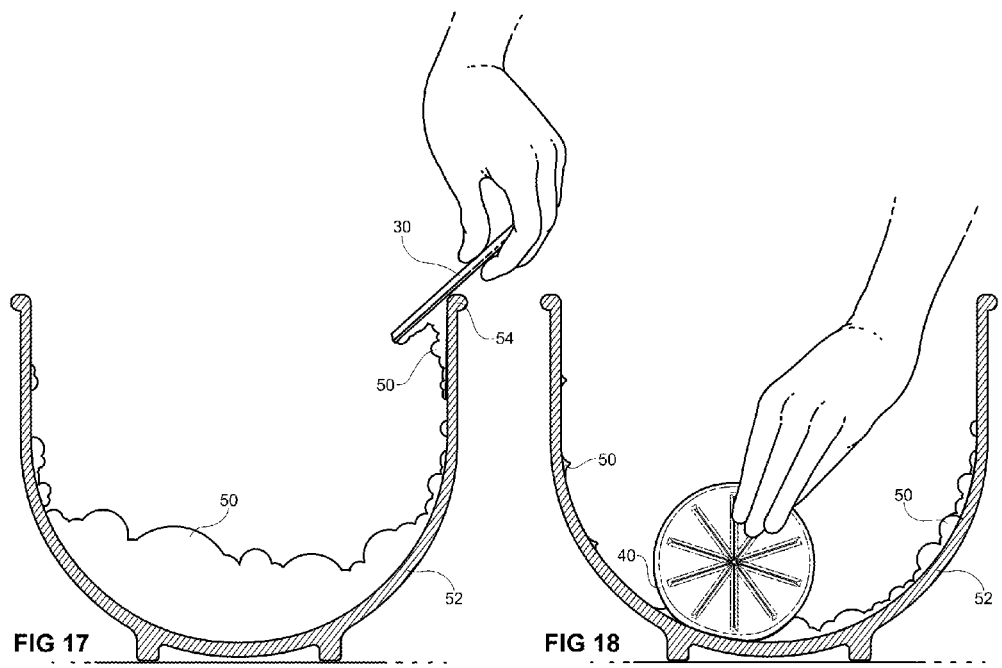
FIG. 17 shows the mixture 50 being scraped off the top surface of the whisk wiper 30 on the lip 54 of the mixing bowl 52.
FIG. 18 shows the outer beveled edge 40 being used to wipe out the mixing bowl 52.

FIG. 17 shows the wiping of the whisk wiper 30 off on the lip 54 of the bowl 52, thereby returning the mixture 50, which was wiped from the wire loops 44, to the mixing bowl 52, which is shown in cross section. Since the top surface of the whisk wiper 30 has no depressions or protrusions it is ideally suited to return the remnant mixture 50 in this manner.

As shown in FIG. 18 the whisk wiper 30 can also be used, separately from the whisk 46, to wipe out the mixing bowl 52. The whisk wiper 30 is simply gripped on one side and the other side's beveled edge 40 is pressed against the inner surface of the bowl to make as much contact as both the flexibility of the silicone at the edge and the difference between the contour of the whisk wiper 30 and the mixing bowl 52 will allow.

Where strokes with the whisk wiper 30 do not overlap remnants of mixture 50 are left behind in streaks, shown in FIG. 18 in cross section on the left side of the bowl 52. Where there is a significant difference between the contour of the outer beveled edge 40 of the whisk wiper 30 and the bowl 52 numerous wiping stokes are needed to ensure there are no remnants of the mixture 50.

A top view of the first alternative embodiment of the whisk wiper 56, shown in FIG. 7, has an outer contour with a gradually decreasing curvature as the contour runs in the clockwise direction as shown. The cook can rotate this first alternative embodiment of the whisk wiper 56 to find the portion of its contour best suited to the bowl being wiped out. Also included in the contour of the first alternative embodiment of the whisk wiper 56 are a flat portion and a right angle to allow for the wiping of flat surfaces and inside corners.

The first alternative embodiment of the whisk wiper 56 shows some of the variations that are possible in the device and also includes an extra slit 58 which is open to the outer edge. This extra slit 58 could be used to clean a knife, spatula or other utensil. The first alternative embodiment of the whisk wiper 56 also has 8 slits 32 to suit it for use with a whisk having up to 8 loops.

FIG. 8 shows a top view of a second alternative embodiment of the whisk wiper 60 which has three slits 32, to be used with a whisk having 3 wire loops, and features an outer contour which is round on one side and square on the other. The flexible material only partial covers the rigid frame along the operative edges and slits in this embodiment. A hard scraper 62 makes up one of the corners to offer another option in cleaning. This illustrates the added benefit of the whisk wiper in providing a location to which useful tools can be added.

FIG. 9 shows a top view of a third alternative embodiment of the whisk wiper 64 which has three curved slits 66, and an outer contour including a concave portion 68, and an acutely angled point 70. The curved slits 66 would not prevent pulling this third alternative embodiment of the whisk wiper 64 down toward the handle of a whisk as the wire loops of a whisk are flexible and a slight twisting motion would be all that would be required to smoothly guide it into place. In the case where the edges of the slits 66 are very flexible and exert little friction force onto the wire loops the curvature in the slits would better prevent inadvertent slipping during mixing. Optionally pulling the third alternative embodiment of the whisk wiper 40 off of a whisk without rotating it would result in the wire loops of the whisk being twisted and would result in a greater force being exerted by the outer squeegee edge of each slit, which could be advantageous in wiping off stubborn remnants of mixture. The concave portion 68 could be used to wipe convex surfaces, and the tip 60 could be used in wiping out crevices.

While it is important that the whisk wiper device have both flexibility in its operative edges and a frame work that is inflexible enough to prevent the buckling and collapse of the device while it's being pulled onto or off of the whisk, it is not necessary that this framework be entirely rigid as the forces involved in the use of the whisk wiper device are not great. It is both possible and advantageous, from a manufacturing standpoint, to form the whisk wiper out of a single material as shown in FIGS. 19-24.

Figure 19:
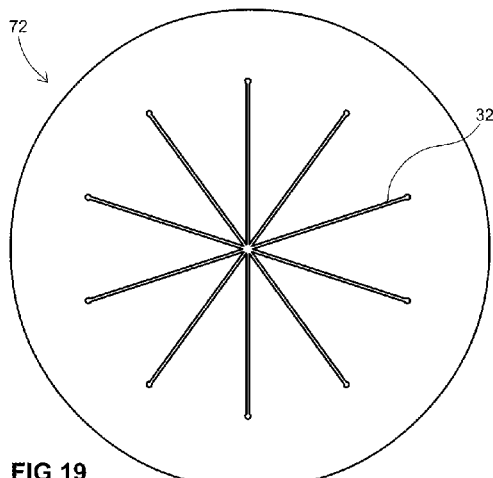
FIG. 19 shows a top view of the fourth alternative embodiment of the whisk wiper 72.
Figure 20:
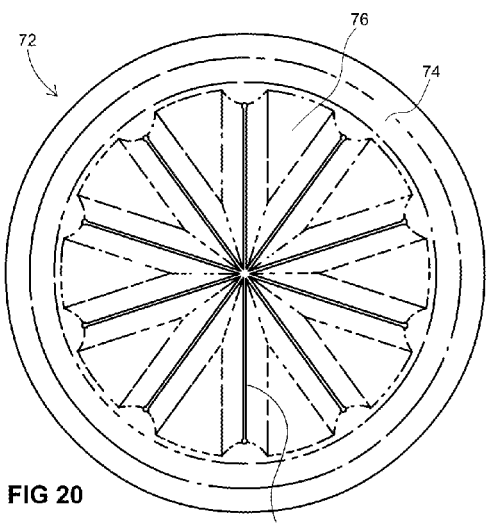
FIG. 20 shows a bottom view of the fourth alternative embodiment of the whisk wiper 72.
Figure 21:
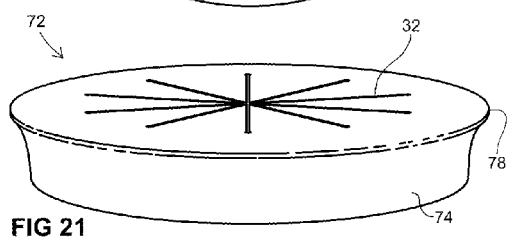
FIG. 21 is a perspective view showing the top and side of the fourth alternative embodiment of the whisk wiper 72 of FIG. 19.
Figure 23:
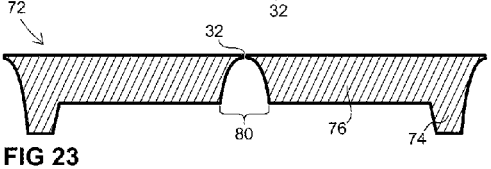
FIG. 23 is a cross-sectional view of fourth alternative embodiment of the whisk wiper 72 of FIG. 19 showing the thickened ring 74, thickened wedge 76 and concave groove 80.
Figure 22:
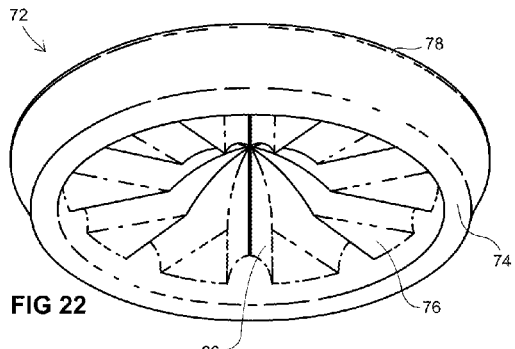
FIG. 22 is a perspective view showing the bottom and side of the fourth alternative embodiment of the whisk wiper 72 of FIG. 19.
Figure 24:
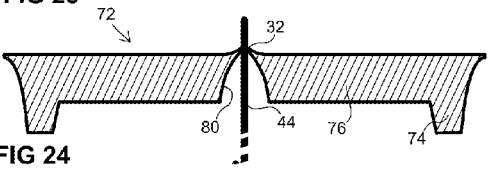
FIG. 24 is the view of FIG. 23 with a single wire loop 44 being passed through the slit 32.

FIG. 19 is a top view, FIG. 20 a bottom view, FIG. 21 a perspective view showing the top and side, FIG. 22 a perspective view showing the bottom and side, and FIGS. 23-24 cross sectional views of the fourth alternative embodiment of the whisk wiper 72. These views correspond to the views shown of the whisk wiper 30 in FIGS. 1-6 to make comparison easier. The fourth alternative embodiment of the whisk wiper 72 also has five slits 32.

The fourth alternative embodiment of the whisk wiper 72 is made of a single piece of material. The degree of flexibility at both the operative edges and in the regions where a support framework is required is determined by the thickness of the material as shown in FIGS. 20-24. Even a relatively inflexible material, like ABS plastic for example, can become relatively flexible if it is thin enough, and a relatively flexible material, like rubber for example, can become relatively inflexible if it is thick enough. These facts allow for a broad range of choices in material in creating the fourth alternative embodiment of the whisk wiper 72.

A thickened ring 74 runs around the fourth alternative embodiment of the whisk wiper 72 just beyond the ends of the slits 32 and is wide and thick enough, given the material used, to maintain its shape during normal use.

Five thickened wedges 76 extend from the inside of the thickened ring 74 toward the point at which the slits 32 intersect. These thickened wedges 76 are on either side of and provide support to the slits 32 so that they maintain their general dispositions during normal use. During normal use the forces acting on the thickened wedges 76 are a fraction of those acting on the thickened ring 74 so it is not necessary for them to be as thick. The example depicted in FIGS. 20-24 features thickened wedges 76 which are about half the thickness of the thickened ring 74.

The operative edges of the fourth alternative embodiment of the whisk wiper 72, the outer circumference of the concave edge 78, and the opposed edges of the slits 32, have a flexibility provided by the degree to which they have been thinned and the width of the thinned area. Consistent with a less flexible material than that of the silicone material 36 of the whisk wiper 30, the concave edge 78 is thinned to a relatively narrow wall that extends out from the thickened ring 74. Similarly a concave groove 80 which is wide, relative to the groove 42, makes thinned walls which extend out from the thickened wedges 76 to the opposed edges of the slits 32. FIG. 23 clearly shows, in cross section, the thicknesses of the fourth alternative embodiment of the whisk wiper 72. FIG. 24 shows the loop 44 passing through the slit 32, just as in FIG. 6, with the opposed edges of the slit 32 flexing aside.

Figure 25:
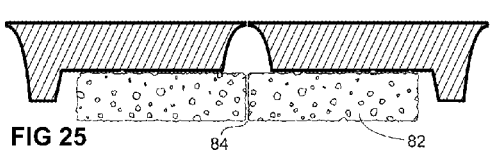
FIG. 25 shows a cross section of the fourth alternative embodiment of the whisk wiper 72 including a sponge 82.
Figure 26:
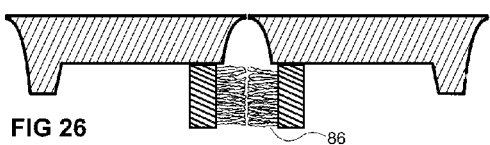
FIG. 26 shows a cross section of the fourth alternative embodiment of the whisk wiper 72 including brushes 86.

FIG. 25 shows a sponge 82, with a deep slit 84 cut into it, which is attached to the back of the fourth alternative embodiment of the whisk wiper 72. The sponge 82 would provide additional means of cleaning the loops 44. Similarly FIG. 26 shows opposed brushes 86 positioned to provide additional cleaning means.

Figure 27:
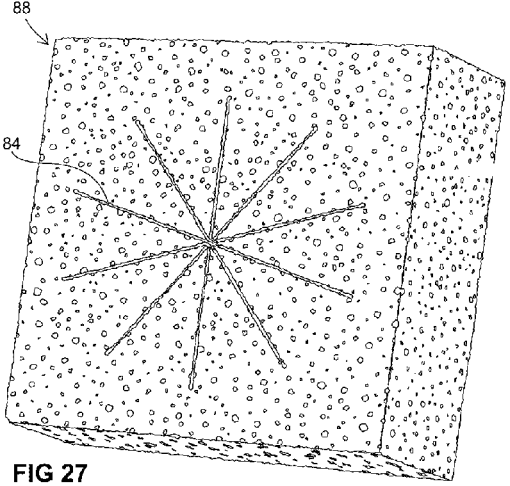
FIG. 27 shows a perspective view of the fifth alternative embodiment of the whisk wiper 88 consisting of a rectangular sponge with deep slits 84 cut through it.

FIG. 27 shows a fifth alternative embodiment of the whisk wiper 88 which is composed of only a conventional sponge with deep slits 84 cut through it. This extremely economical embodiment lacks the grooves, frame, thickened areas, or other details of the other embodiments and though it would not work as well in retaining mixture to be returned to the mixing bowl, since it is absorbent, it would still work very well in cleaning the whisk, particularly with soap and water.

While it is preferable that the whisk wiper have a number of slits which corresponds to the number of wire loops on a whisk, it is not necessary. It is only important that the number of slits be equal to or greater than the number of loops on the whisk. For example a whisk wiper having 8 slits, as the first alternative embodiment of the whisk wiper 56, would be compatible with the whisk 46 having 5 loops. Some difference in angular disposition between the slits and the loops would be acceptable as the loops are flexible.

The variations in the embodiments shown in FIG. 7, FIG. 8 and FIG. 9 illustrate the adding of additional tools and features valuable to the cook, and there are of course many more such tools and features. The sponge 82 and brushes 86 shown are just two simple examples of the many combined cleaning means which could be part of the whisk wiper. There are a wide variety of designs which would suitably arrange the slits in the angular dispositions desired which would also work well.

The deep slits 84 shown in FIG. 27 would have the advantage of providing a larger surface area to scrub the loops of the whisk clean, particularly with soap and water as stated earlier. One disadvantage could be that food would get trapped within the deep slit and it would take additional time to clean this out.

Figure 28:
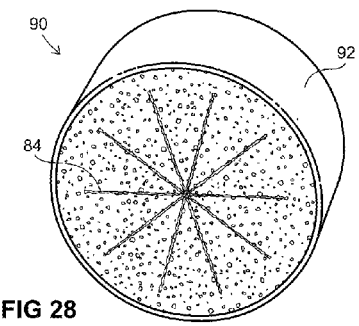
FIG. 28 shows a perspective view of the sixth alternative embodiment of the whisk wiper 90 consisting of a sponge with a sleeve 92 with deep slits 84 cut through it.
Figure 29:
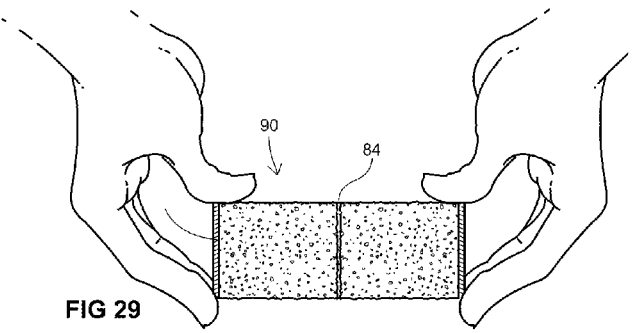
FIG. 29 shows a cross section of the sixth alternative embodiment of the whisk wiper 90 showing the sleeve 92 surrounding the sponge with a deep slit 84 in the center, which corresponds to FIG. 28, and being gripped prior to its being turned inside out.

The sixth alternative embodiment of the whisk wiper 90, shown in FIG. 28, solves this problem. The sixth alternative embodiment of the whisk wiper 90 is shown as a sponge with deep slits 84 and with a sleeve 92 surrounding it. By pushing one end of the sleeve through the other end, shown in FIGS. 29, 30, 31, 32, 33, 34 and 35, the sixth alternative embodiment of the whisk wiper 90 is turned inside out. Once inside out the sixth alternative embodiment of the whisk wiper 90 no longer has deep slits 84 but instead the edges that formed those slits are now exposed as the outer edge. Once turned inside out in this way the sixth alternative embodiment of the whisk wiper 90 would be very easy to clean. The sleeve 92 could be composed of an elastic material to facilitate this feature. While the sleeve 92 may be advantageous in providing stability when a soft material is used for the body of the whisk wiper it would not always be necessary in accomplishing this function. The whisk wiper could be composed of a single material without a sleeve and still be turned inside out by pushing one end of the wiper through the other end.

Another advantage of the sixth alternative embodiment of the whisk wiper 90 and the fifth alternative embodiment of the whisk wiper 88, is that they can be composed of a soft material such as a sponge. While the thickness of the whisk wiper can provide enough resiliency to maintain the edges of the deep slits 84 in contact, the softness of the material may mean that there is not much pressure exerted on the wire loops to effect the same wiping motion possible with a rubber type material. The seventh alternative embodiment of the whisk wiper 94 solves this problem.

Figure 36:
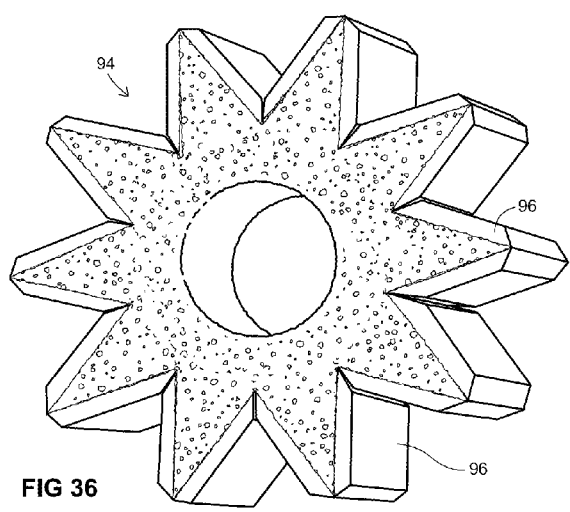
FIG. 36 shows a perspective view of the seventh alternative embodiment of the whisk wiper 94, inside out, and with edge extensions 96.
Figure 37:
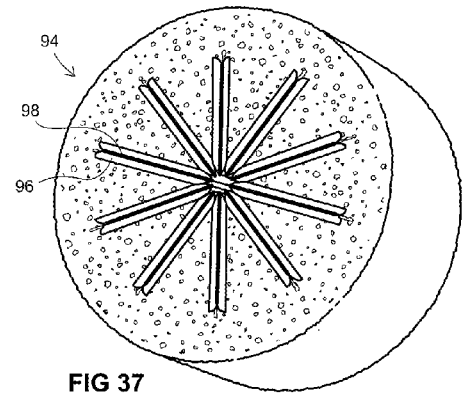
FIG. 37 shows a perspective view of the seventh alternative embodiment of the whisk wiper 94, right side out, and with edge extensions 96 coming together to form compressed slits 98.
Figure 38:
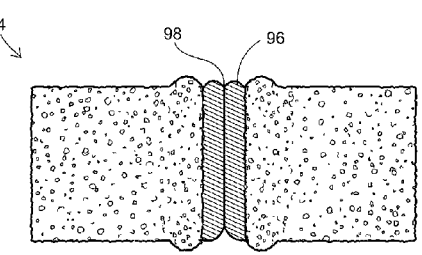
FIG. 38 corresponds to FIG. 37 and shows a cross section of the seventh alternative embodiment of the whisk wiper 94, right side out, and with edge extensions 96 coming together to form compressed slits 98.
Figure 39:
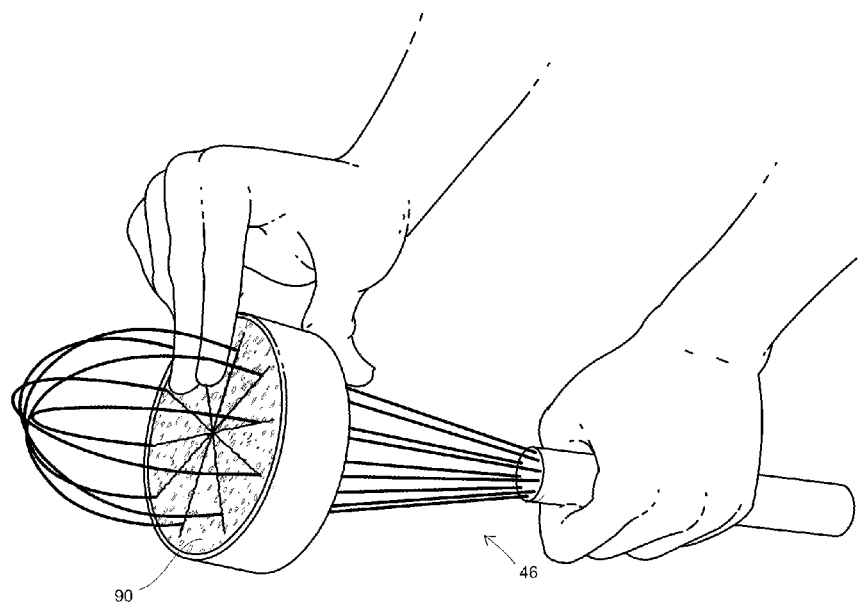
FIG. 39 shows the whisk 46 in combination with the sixth alternative embodiment of the whisk wiper 90.

In FIGS. 36, 37 and 38 show the seventh alternative embodiment of the whisk wiper 94 which has extended edges 96. In FIG. 36 the seventh alternative embodiment of the whisk wiper 94 is shown "inside out", with respect to its functional use in wiping a whisk. Once turned right side out, as shown in FIG. 37, the extended edges push against each other forming a compressed slit 98. This compression is shown in FIG. 38 with bulges in the material on either side to illustrate this concept. FIG. 38 exaggerates this bulging for clarity. The compressed slits would have the advantage of pressing with more force and scrubbing more effectively on the loops as they are moved through the slits. The seventh alternative embodiment of the whisk wiper 94 is also shown without a distinct sleeve, though it may be advantageous to include one.

FIG. 36 shows the extended edges 96 as distinct from the sponge material that makes up the body of the seventh alternative embodiment of the whisk wiper 94. The edge extensions could be composed of a different material. It is common for dish washing sponges to include a scrubbing surface attached to one side. This is a more economical way of providing a superior material to what the sponge material provides.

The seventh alternative embodiment of the whisk wiper 94 could be composed of all one material, like sponge. One way this could be accomplished is that the seventh alternative embodiment of the whisk wiper 94 could be initially manufactured in the "inside out" position, with the outer edge including the edge extensions 96. So, while the simplest way to form the sixth alternative embodiment of the whisk wiper 90 could be to cut the asterisk into a sheet of sponge material, the forming of the seventh alternative embodiment of the whisk wiper 94 could be very different, with a star shape, like that shown in FIG. 36, being cut into a sheet of sponge.

Figure 30:
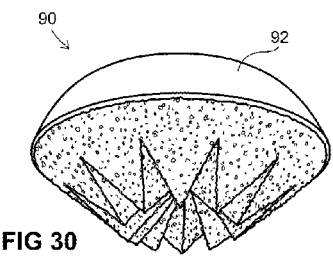
FIG. 30 shows a perspective view of the sixth alternative embodiment of the whisk wiper 90 as it would appear with one end of the sleeve 92 as it is being pushed toward the other end, in the process of turning it inside out.
Figure 31:
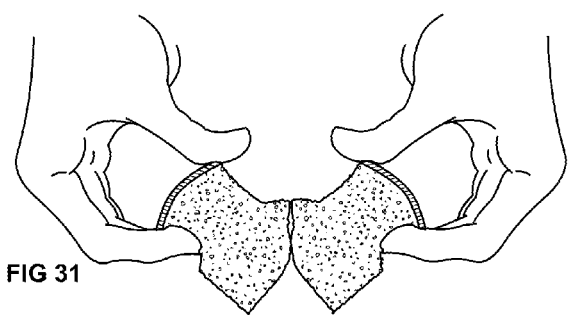
FIG. 31 corresponds to FIG. 30 and shows a cross section of the sixth alternative embodiment of the whisk wiper 90 being gripped with one end of the sleeve 92 being pushed toward the other end, in the process of turning it inside out.
Figure 32:
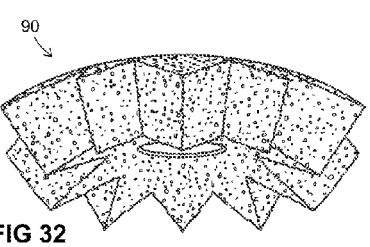
FIG. 32 shows a perspective view of the sixth alternative embodiment of the whisk wiper 90 as it would appear with one end of the sleeve 92 being pushed through the other end, in the process of turning it inside out.
Figure 33:
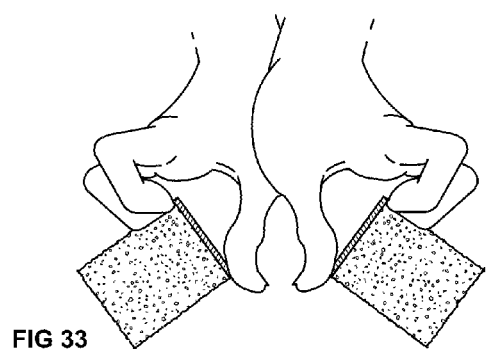
FIG. 33 corresponds to FIG. 32 and shows a cross section of the sixth alternative embodiment of the whisk wiper 90 being gripped with one end of the sleeve 92 being pushed with the thumbs through the other end, in the process of turning it inside out.
Figure 34:
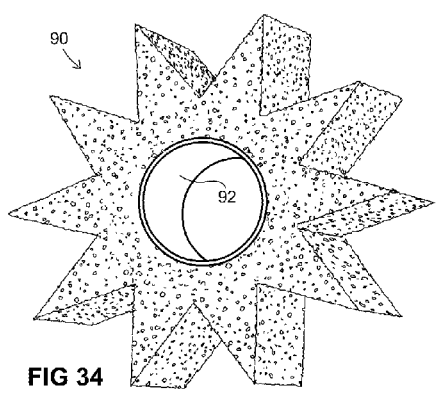
FIG. 34 shows a cross section of the sixth alternative embodiment of the whisk wiper 90 having being turned inside out with the sleeve 92 now located at the center.
Figure 35:
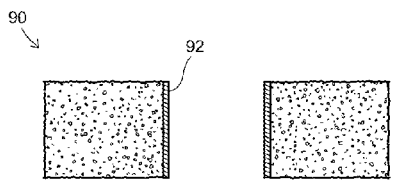
FIG. 35 corresponds to FIG. 34 and shows a cross section of the sixth alternative embodiment of the whisk wiper 90 having been turned inside out with the sleeve 92 located at the center.

This concept of the whisk wiper being reversible, or capable of being turned inside out, as well as the extension of the edges, could be applied to other embodiments of the whisk wiper. The edge extension would work well with the slits 32 as well. To have extended edges it would not even be necessary to form the whisk wiper in the inside out position. The whisk wiper could be formed in a cone, like what is shown in FIG. 30, but with extended edges, and then flattened, the extended edges pressing firmly together forming a compressed slit.

None of the specifics of the detailed description above should be construed as limiting the scope of the invention but as merely providing illustrations of a few preferred embodiments of this invention. Thus the scope of the invention should be determined by the following claims and their legal equivalents, rather than by the examples given.

Having thus described the invention,

I claim:

1. A method for wiping a whisk comprising the steps of:
providing a whisk, said whisk comprising loops attached to a base;
providing a whisk wiper, said whisk wiper comprising slits;
mounting said whisk wiper onto said whisk by pushing said loops through said slits, pulling said whisk wiper toward said base, thereby exposing said loops beyond said whisk wiper;
causing said loops to contact a mixture, thereby causing some of said mixture to adhere to said loops;
pulling said whisk wiper away from said base and off of said whisk, thereby wiping said material off of said loops with said slits.

2. The method of claim 1 further comprising said whisk wiper comprising grooves, said grooves leading into said slits, said pushing said loops through said slits further comprising contacting said grooves with said loops.

3. The method of claim 1 further comprising providing a container, said container comprising a lip, said wiping said material off of said loops with said slits causing said material to be gathered onto said whisk wiper, said material which has been gathered onto said whisk wiper being placed in said container by wiping said whisk wiper against said lip.

4. The method of claim 1 further comprising providing a container, said whisk wiper further comprising an outer edge, said whisk wiper being employed in wiping out said container by contacting said container with said outer edge.

5. The method of claim 4 further comprising said outer edge having a contour that varies in shape, said wiping out said container further comprising rotating said wiper to select a portion of said outer edge best suited to said container.

6. The method of claim 1 further comprising turning said whisk wiper inside out.

7. The method of claim 6 wherein said whisk wiper comprises a sleeve, said sleeve comprises a first and a second end, said turning said whisk wiper inside out comprising pushing said first end through said second end, said method of claim 6 further comprising cleaning said whisk wiper subsequent to said whisk wiper being turned inside out.

8. A whisk with whisk wiper device comprising:
a whisk, said whisk comprising a plurality of loops attached to a base, said loops having a widest part;

a whisk wiper, said whisk wiper comprising a plurality of slits;

said whisk wiper being mounted onto said whisk with said loops passing through said slits, said loops being exposed beyond said slits, said whisk wiper being configured to be movable past said widest part of said loops.

9. The device of claim 8 wherein said whisk wiper further comprises grooves, said grooves leading into said slits.

10. The device of claim 8 wherein said whisk wiper further comprises an outer edge, said outer edge having a curved contour.

11. The device of claim 8 wherein said whisk wiper comprises a sleeve, said sleeve having a first end and a second end, whereby said whisk wiper can be turned inside out by pushing said first end through said second end.

12. The device of claim 8 further comprising:

said loops being disposed in an angularly spaced orientation; and said whisk wiper further comprises a central portion, said central portion being composed of a flexible material; and said slits being located within said central portion, said slits being disposed in an angularly spaced orientation, said slits comprising opposed edges, said opposed edges substantially meeting, said opposed edges being substantially in alignment.

13. The device of claim 12 further comprising:

said whisk wiper comprising a support frame, said support frame having a middle portion comprising a plurality of oblong apertures which intersect and are disposed in an angularly spaced orientation, said support frame being composed of a substantially inflexible composition; and said slits in said central portion being in alignment with said apertures, wherein each slit is substantially aligned with the major axis of a said oblong aperture.

14. A whisk and wiper device comprising:

a whisk, said whisk comprising a plurality of loops attached to a base, said plurality of loops being in an angularly spaced orientation;

a wiper, said wiper comprising a central portion, said central portion comprising a flexible material, said central portion having a plurality of slits, said slits intersecting and being in angularly spaced orientation, said slits comprising opposed edges;

whereby said wiper can be mounted onto said whisk with said loops passing through said slits, said whisk can be employed causing a mixture to adhere to said loops, said wiper can be pulled off of said loops, said opposed edges of said slits wiping said mixture off of said loops.

15. The device of claim 14 further comprising:

said wiper comprising grooves, said grooves leading into said slits.

16. The device of claim 14 further comprising:

said loops comprising a width, said opposed edges have a distance between them that is less than said width of said loops, said opposed edges being in alignment; and said wiper comprising an outer edge, said outer edge being flexible.

17. The device of claim 16 further comprising:

said outer edge comprising a curved contour.

18. The device of claim 14 further comprising:

said wiper comprising a sleeve.

19. The device of claim 18 further comprising:

said opposed edges comprising edge extensions, wherein said slit formed by said edge extensions of said opposed edges is compressed.

20. The device of claim 14 further comprising:

said loops have a width, said opposed edges have a distance between them that is less than said width of said loops, said opposed edges being in alignment; and said slits are at least three in number, wherein slits are counted such that three intersecting slits create an asterisk pattern with six points; and said wiper comprises a top side and a bottom side, said top side comprising a substantially flat surface, said bottom side comprising grooves, said grooves surrounding said slits.

* * * * *